(12) United States Patent
Liu

(10) Patent No.: US 11,295,638 B2
(45) Date of Patent: Apr. 5, 2022

(54) DISPLAY PANEL SUPPORT AND DISPLAY DEVICE

(71) Applicant: Wuhan China Star Optoelectronics Semiconductor Display Technology Co., Ltd., Hubei (CN)

(72) Inventor: Lang Liu, Hubei (CN)

(73) Assignee: Wuhan China Star Optoelectronics Semiconductor Display Technology Co., Ltd.

(*) Notice: Subject to any disclaimer, the term of this patent is extended or adjusted under 35 U.S.C. 154(b) by 92 days.

(21) Appl. No.: 15/733,183

(22) PCT Filed: Mar. 16, 2020

(86) PCT No.: PCT/CN2020/079466
§ 371 (c)(1),
(2) Date: Jun. 5, 2020

(87) PCT Pub. No.: WO2021/103348
PCT Pub. Date: Jun. 3, 2021

(65) Prior Publication Data
US 2021/0375164 A1 Dec. 2, 2021

(30) Foreign Application Priority Data
Nov. 27, 2019 (CN) .......................... 201911182968.X

(51) Int. Cl.
*G06F 1/16* (2006.01)
*G09F 9/30* (2006.01)

(52) U.S. Cl.
CPC ............ *G09F 9/301* (2013.01); *G06F 1/1616* (2013.01); *G06F 1/1624* (2013.01); *G06F 1/1652* (2013.01)

(58) Field of Classification Search
CPC ............................ G06F 1/1652; G06F 1/1681
See application file for complete search history.

(56) References Cited

U.S. PATENT DOCUMENTS

| | | | | |
|---|---|---|---|---|
| 8,804,324 B2* | 8/2014 | Bohn | ..................... | G06F 1/1681 361/679.27 |
| 10,423,196 B2* | 9/2019 | Seo | ......... | G06F 1/1681 |
| 10,831,234 B1* | 11/2020 | Watamura | ............. | G06F 1/1652 |
| 2012/0307423 A1* | 12/2012 | Bohn | ..................... | G06F 1/1652 361/679.01 |
| 2013/0342090 A1* | 12/2013 | Ahn | ......................... | G09F 9/33 312/258 |
| 2014/0042293 A1* | 2/2014 | Mok | ..................... | G06F 1/1652 248/682 |

(Continued)

FOREIGN PATENT DOCUMENTS

CN 102262845 A 11/2011
CN 203488699 U 3/2014
(Continued)

*Primary Examiner* — Adrian S Wilson
(74) *Attorney, Agent, or Firm* — Luedeka Neely Group, P.C.; Rick Barnes

(57) ABSTRACT

The present invention provides a display panel support and a display device. A bending area of the display panel is protected by friction or resistance generated between the second support plate and the third support. In addition, the bending area of the display panel is protected by resistance caused by an elastic force or repulsive force or resistance between magnetism.

9 Claims, 3 Drawing Sheets

(56) References Cited

U.S. PATENT DOCUMENTS

| | | | | |
|---|---|---|---|---|
| 2014/0126121 A1* | 5/2014 | Griffin | ............... | H04M 1/0216 |
| | | | | 361/679.01 |
| 2015/0233162 A1* | 8/2015 | Lee | ...................... | G06F 1/1626 |
| | | | | 16/223 |
| 2015/0366089 A1* | 12/2015 | Park | ..................... | G06F 1/1641 |
| | | | | 361/679.01 |
| 2015/0370287 A1* | 12/2015 | Ko | ........................ | G06F 1/1626 |
| | | | | 361/749 |
| 2015/0378397 A1* | 12/2015 | Park | ..................... | G06F 1/1656 |
| | | | | 361/679.27 |
| 2016/0085265 A1* | 3/2016 | Park | ..................... | G06F 1/1616 |
| | | | | 361/807 |
| 2016/0116944 A1* | 4/2016 | Lee | .................... | H04M 1/0216 |
| | | | | 361/679.26 |
| 2016/0278222 A1 | 9/2016 | Lee | | |
| 2020/0326757 A1* | 10/2020 | Huang | ................. | H04M 1/022 |

FOREIGN PATENT DOCUMENTS

| CN | 205460733 U | 8/2016 |
|---|---|---|
| CN | 109661131 A | 4/2019 |
| CN | 109859634 A | 6/2019 |
| CN | 209070886 U | 7/2019 |
| CN | 110267475 A | 9/2019 |

\* cited by examiner

DISPLAY PANEL SUPPORT AND DISPLAY DEVICE

BACKGROUND OF INVENTION

Field of Invention

The present invention relates to a field of display technology, and in particular, to a display panel support and a display device.

Description of Prior Art

In the display panel industry, accompanied by the large-scale production and use of organic light-emitting diode (OLED) flexible screens, mobile terminals such as foldable screen phones and tablets have become a major trend, which have a significant advantage of larger display area without taking up more storage space. However, there is always a problem with foldable screens, that is, the bendable part of the screen will experience tens of thousands of bending deformations during use, which will eventually lead to damage to the bending area of the screen.

In the prior art, in order to solve the problem that the curvature radius of the bending area of the flexible screen is too small, which causes the bending area of the screen to be vulnerable, a hollow structure is made below the bending area of the screen to reserve a hollow portion which provides a space for the bending area of the foldable screen, so that the curvature radius of the bending area of the flexible screen in this space can be made larger, resulting in a smaller degree of bending. However, the bending area will have a problem of depression or unevenness due to the hollow portion.

Therefore, there is a need to provide a display panel support and a display device, so as to improve the protection of the bending area of the flexible display screen.

SUMMARY OF INVENTION

An object of the present invention is to provide a display panel support and a display device. A second support plate and a slide rail are provided at a third support corresponding to a bending space of the display panel. The second support plate slides up and down on the slide rail, and the bending area of the display panel is protected by friction or resistance generated between the second support plate and the third support.

In order to achieve the above object, the present invention provides a display panel support including a first support, a second support, and a third support, wherein the third support has one end rotatably connected to the first support and another end rotatably connected to the second support; wherein the first support and the second support have a same structure, and a first support plate is provided above both the first support and the second support; and wherein the third support has a slide rail perpendicular to the first support plate, a second support plate is disposed at an upper end of the slide rail, and the second support plate is parallel to a bottom of the third support and capable of moving up and down along the slide rail.

Further, a first magnet is disposed on a lower surface of the second support plate; and a second magnet is provided at a bottom of the third support, an N pole of the first magnet corresponds to an N pole of the second magnet, and an S pole of the first magnet corresponds to an S pole of the second magnet.

Further, the first magnet includes a bar magnet, a U-shaped magnet, or an electromagnet; and/or the second magnet includes a bar magnet, a U-shaped magnet, or an electromagnet.

Further, a spring is disposed between the second support plate and the third support.

Further, the display panel support further includes a control circuit connected to opposite ends of the second magnet, wherein the second magnet is an electromagnet.

Further, the control circuit is a series circuit and further includes: a power supply, a switch, a resistor, and a sliding rheostat, which are connected in series in the control circuit.

Further, the display panel support further includes a control system and an angle sensor, wherein the control system is configured to control on and off of the control circuit, and the angle sensor is configured to obtain an angle between the first support and the second support.

Further, the control system includes a processor and a database, and the database is configured to store the angle obtained by the angle sensor; when the angle is greater than 0°, the processor outputs an instruction to turn on the switch, the control system controls the control circuit to turn on the switch and move the sliding rheostat, and the second magnet starts to work; and when the angle is 180°, the sliding rheostat has a maximum resistance value.

The present invention also provides a display device including the display panel support described above, and the display device further includes a display panel disposed on the display panel support.

Further, the display panel has a bending area corresponding to the third support.

A beneficial effect of the present application is that the present invention provides a display panel support and a display device. A second support plate and a slide rail are provided at a third support corresponding to a bending space of the display panel. The second support plate slides up and down on the slide rail, and the bending area of the display panel is protected by friction or resistance generated between the second support plate and the third support. In order to generate the friction or resistance, a spring may be provided between the second support plate and the third support to generate an elastic force, or magnets with repulsive magnetism may be provided between the second support plate and the third support.

BRIEF DESCRIPTION OF DRAWINGS

The following detailed description of specific embodiments of the present application will make the technical solutions and other beneficial effects of the present application obvious in conjunction with the accompanying drawings.

Figure 1:
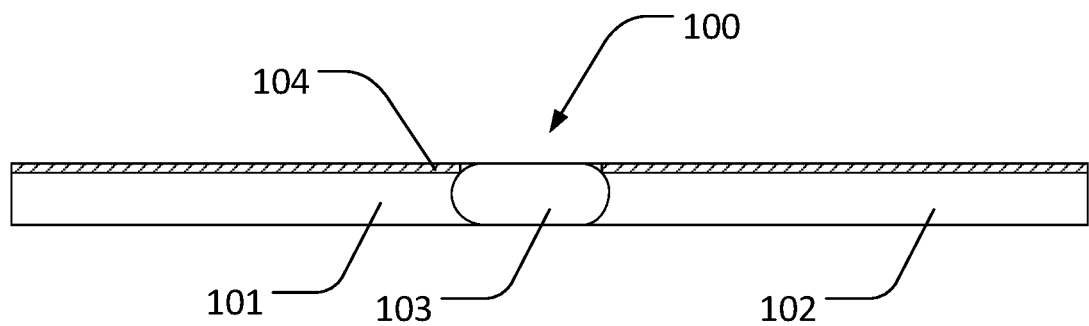
FIG. 1 is a schematic structural diagram of a display panel support in a flat state according to the present invention.

display panel support 100; display device 200;

first support 101; second support 102; third support 103;

first support plate 104; second support plate 105; first magnet 106;
second magnet 107; slide rail 108; display panel 201; bending area 10; control circuit 110; power supply 1101; switch 1102; resistor 1104; sliding rheostat 1103.

DETAILED DESCRIPTION OF PREFERRED EMBODIMENTS

The specific structural and functional details disclosed herein are merely representative and are for the purpose of describing exemplary embodiments of the present application. However, the present application may be embodied in many alternative forms and should not be construed as limited to the embodiments set forth herein.

In the description of the present invention, it is to be understood that the terms "center", "lateral", "upper", "lower", "left", "right", "vertical", "horizontal", "top", "bottom", "inside", "outside" and the like are based on the orientation or positional relationship shown in the drawings, and is merely for the convenience of describing the present invention and simplifying the description, and does not indicate or imply that the indicated devices or components must be in particular orientations, or constructed and operated in a particular orientation, and thus are not to be construed as limiting the invention. Furthermore, the terms "first", "second", etc. in the specification and claims of the present invention and the above figures are used to distinguish similar objects, and are not necessarily used to describe a specific order or prioritization. It should be understood that the objects so described are interchangeable when it is appropriate. Moreover, the terms "including" and "having" and any variations thereof are intended to cover a non-exclusive "inclusion".

In the description of this application, it should be noted that the terms "installation", "connected", and "connected" should be understood in a broad sense unless explicitly stated and limited otherwise. For example, it can be a fixed connection, a detachable connection, or an integral connection; it can also be a mechanical connection or an electrical connection; it can be a direct connection; or it can be an indirect connection through an intermediate medium; or it can be a communication between two components.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "includes," "including," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

Figure 2:
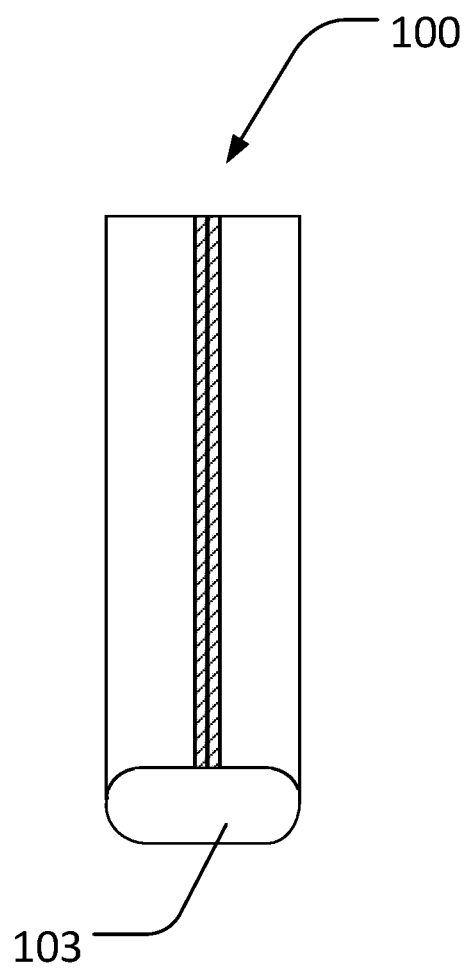
FIG. 2 is a schematic structural diagram of a display panel support in a folded state according to the present invention.

As shown in FIG. 1, the present invention provides a display panel support 100. In one embodiment, the display panel support 100 includes a first support 101, a second support 102, and a third support 103. The third support 103 has one end rotatably connected to the first support 101 and another end rotatably connected to the second support 102. The display panel support 100 in a folded state is shown in FIG. 2.

Figure 3:
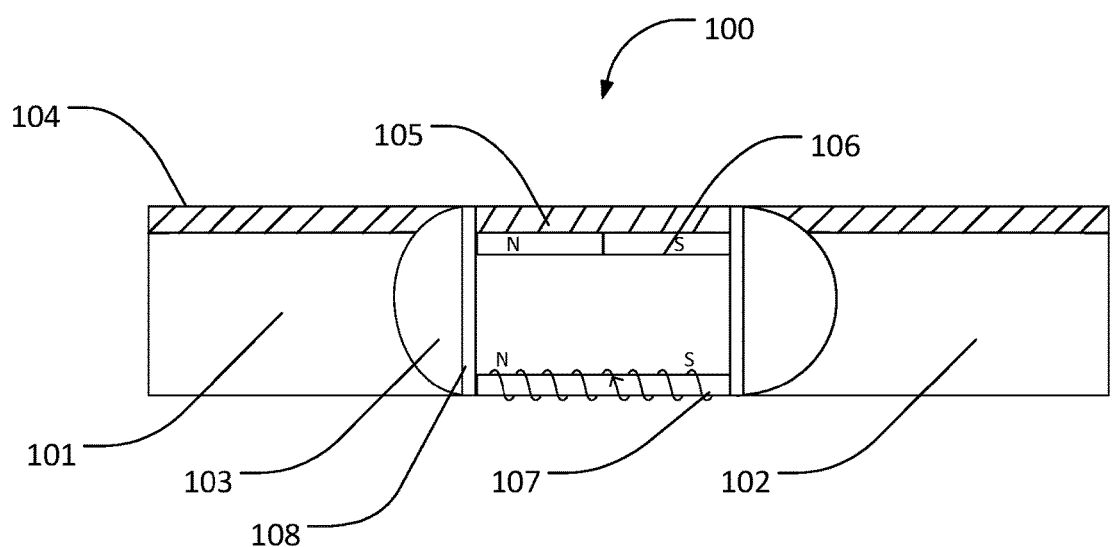
FIG. 3 is a schematic structural diagram of a third support in a flat state according to the present invention.

As shown in FIG. 3, the first support 101 and the second support 102 have a same structure, and a first support plate 104 is provided above both the first support 101 and the second support 102; and the third support 103 has a slide rail 108 perpendicular to the first support plate 104, a second support plate 105 is disposed at an upper end of the slide rail 108, and the second support plate 105 is parallel to a bottom of the third support 103 and capable of moving up and down along the slide rail 108.

The third support 103 is a U-shaped structure. The third support 103 is configured to provide a bending space for the flexible screen mounted on the display panel support 100, and the second support plate 105 is configured to provide a support for the bending area to the flexible display screen, which can solve the problem of depression or unevenness caused by the bending space in the bending area of the flexible display screen.

The second support 102 needs to be given a supporting force in order to provide a protective support effect to the bending area of the flexible display screen.

In one of the embodiments, the simplest implementation is to set a spring (not shown) between the bottom of the third support 103 and the second support plate 105. When the flexible display screen is bent, the second support plate 105 moves up and down along the slide rail 108, and meanwhile, due to the mutuality of the forces, the spring gives the second support plate 105 an upward force to protect the bending area.

In another embodiment, a first magnet 106 is disposed on a lower surface of the second support plate 105. That is, the first magnet 106 is provided on a side of the second support plate 105 near the third support 103.

A second magnet 107 is provided at the bottom of the third support 103, and the second magnet 107 is disposed opposite to the first magnet 106. Specifically, the N pole of the first magnet 106 corresponds to the N pole of the second magnet 107, and the S pole of the first magnet 106 corresponds to the S pole of the second magnet 107.

The first magnet 106 includes a bar magnet, a U-shaped magnet, or an electromagnet. The second magnet 107 includes a bar magnet, a U-shaped magnet, or an electromagnet.

In the above embodiment, the repulsive force between the two magnets provides an upward force to the second support plate 105 to protect the bending area of the flexible display screen.

In the above embodiment, the first magnet 106 is preferably a U-shaped magnet, and the second magnet 107 is an electromagnet. The magnetic field generated by the electromagnet and the first magnet 106 are mutually exclusive. Of course, both the first magnet 106 and the second magnet 107 may be bar magnets or U-shaped magnets. In this case, the second support plate 105 may also be directly made of a magnetic material, and the bottom of the third support 103 may also be made of a magnetic material directly.

The display panel support 100 further includes a control circuit 110, a control system, and an angle sensor.

Figure 4:
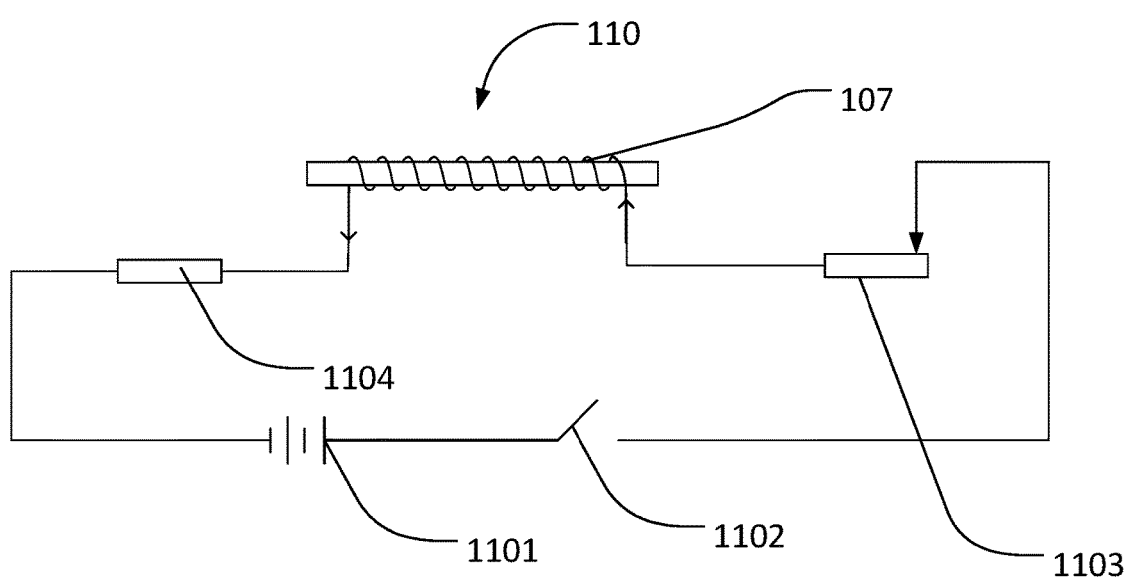
FIG. 4 is a circuit diagram of a control circuit according to the present invention.

As shown in FIG. 4, the control circuit 110 is connected to opposite ends of the second magnet 107. The control circuit 110 is a series circuit, and further includes a power supply 1101, a switch 1102, a resistor 1104, and a sliding rheostat 1103. The power supply 1101, the switch 1102, the resistor 1104, and the sliding rheostat 1103 are connected in series to the control circuit 110.

The control system is configured to control on and off of the control circuit 110, and the angle sensor is configured to obtain an angle between the first support 101 and the second support 102.

The control system includes a processor and a database, and the database is configured to store the angle obtained by the angle sensor.

Figure 5:
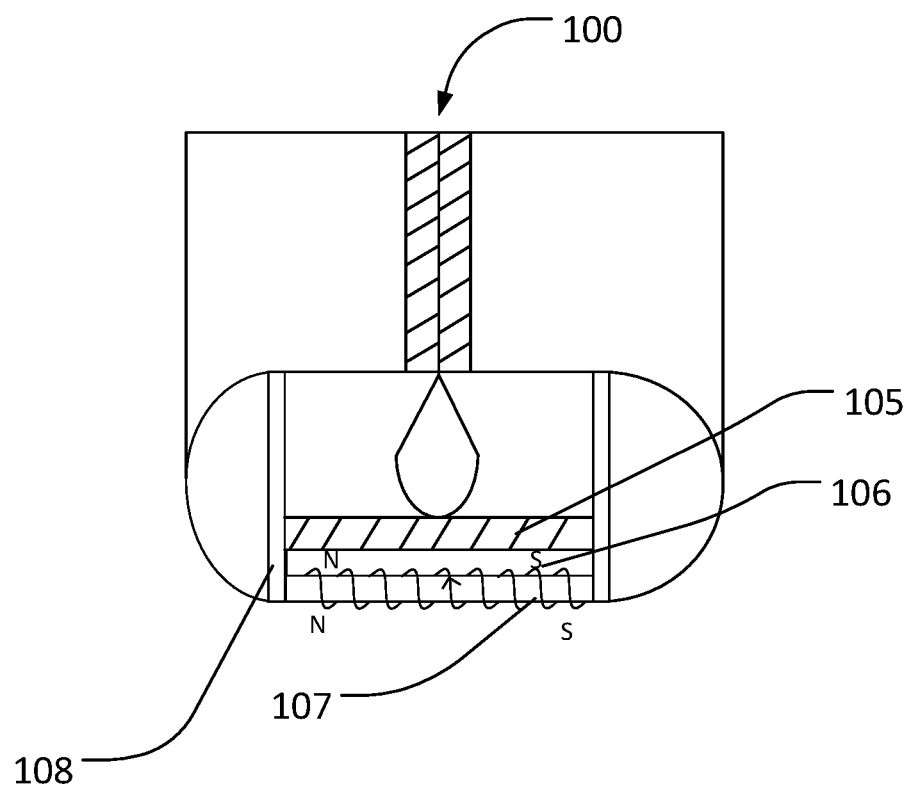
FIG. 5 is a schematic structural diagram of a third support in a folded state according to the present invention.

When the angle is 0°, as shown in FIG. 5, the display panel support 100 is in a folded state. At this time, the second support plate 105 moves to the lower end of the slide rail 108 due to the stress of the bending area, and the control circuit 110 is not turned on at this time.

When the angle is greater than 0°, the processor outputs an instruction to turn on the switch 1102, and the control system controls the control circuit 110 to turn on the switch 1102 and move the sliding rheostat 1103. After the second magnet 107 is energized, a magnetic field is generated. The first magnet 106 is applied with an upward force by the second magnet 107 to protect the bending area of the flexible display screen.

A resistance value of the sliding rheostat 1103 varies according to the variation of the angel. When the angle is 180°, the sliding rheostat 1103 has a maximum resistance value, which provides a larger supporting force when the flexible display screen returns to a flat state, to protect the bending area of the flexible display screen.

Figure 6:
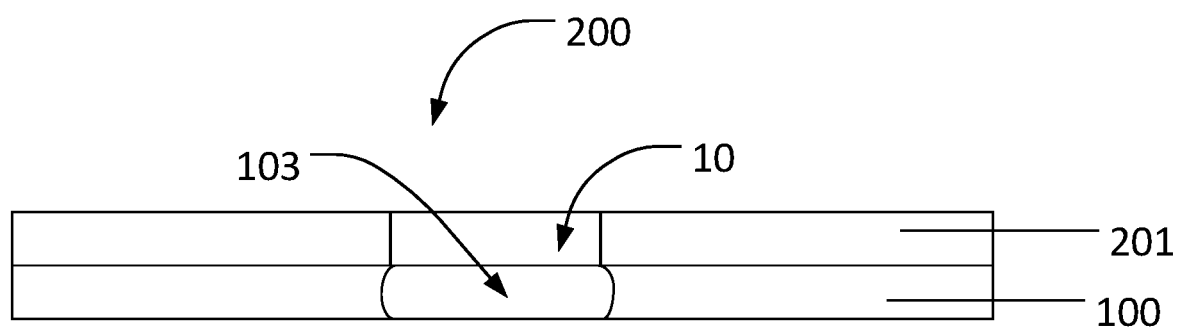
FIG. 6 is a schematic structural diagram of a display device according to the present invention.

As shown in FIG. 6, the present invention further provides a display device 200 including the display panel support 100 and a display panel 201. The display panel 201 is disposed on the display panel support 100.

The display panel 201 is an OLED display panel. The display panel 201 has a bending area 10 corresponding to the third support 103.

The present invention provides a display panel support 100 and a display device 200. A second support plate 105 and a slide rail are provided at a third support 103 corresponding to a bending space of the display panel. The second support plate 105 slides up and down on the slide rail, and the bending area of the display panel is protected by friction or resistance generated between the second support plate 105 and the third support 103. In order to generate the friction or resistance, a spring may be provided between the second support plate 105 and the third support 103 to generate an elastic force, or magnets with repulsive magnetism may be provided between the second support plate 105 and the third support 103.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A display panel support, comprising a first support, a second support, a third support, and a control circuit, wherein the third support has one end rotatably connected to the first support and another end rotatably connected to the second support;
   wherein the first support and the second support have a same structure, and a first support plate is provided above both the first support and the second support;
   wherein the third support has a slide rail perpendicular to the first support plate, a second support plate is disposed at an upper end of the slide rail, and the second support plate is parallel to a bottom of the third support and capable of moving up and down along the slide rail;
   wherein a first magnet is disposed on a lower surface of the second support plate; and a second magnet is provided at a bottom of the third support, an N pole of the first magnet corresponds to an N pole of the second magnet, and an S pole of the first magnet corresponds to an S pole of the second magnet;
   wherein the first magnet comprises a bar magnet, a U-shaped magnet, or an electromagnet; and/or the second magnet comprises a bar magnet, a U-shaped magnet, or an electromagnet;
   wherein the control circuit is connected to opposite ends of the second magnet; and
   wherein the control circuit is a series circuit and further comprises: a power supply, a switch, a resistor, and a sliding rheostat connected in series in the control circuit.

2. The display panel support according to claim 1, wherein
   a spring is disposed between the second support plate and the third support.

3. The display panel support according to claim 1, further comprising a control system and an angle sensor, wherein the control system is configured to control the control circuit to turn on or off, and the angle sensor is configured to obtain an angle between the first support and the second support.

4. The display panel support according to claim 1, wherein
   the control system comprises a processor and a database, and the database is configured to store the angle obtained by the angle sensor;
   when the angle is greater than 0°, the processor outputs an instruction to turn on the switch, the control system controls the control circuit to turn on the switch and move the sliding rheostat, and the second magnet starts to work; and
   when the angle is 180°, the sliding rheostat has a maximum resistance value.

5. A display device, comprising a display panel support and a display panel disposed on the display panel support, wherein
   the display panel support comprises a first support, a second support, a third support, and a control circuit, wherein the third support has one end rotatably connected to the first support and another end rotatably connected to the second support;
   wherein the first support and the second support have a same structure, and a first support plate is provided above both the first support and the second support;
   wherein the third support has a slide rail perpendicular to the first support plate, a second support plate is disposed at an upper end of the slide rail, and the second support plate is parallel to a bottom of the third support and capable of moving up and down along the slide rail;
   wherein a first magnet is disposed on a lower surface of the second support plate; and a second magnet is provided at a bottom of the third support, an N pole of the first magnet corresponds to an N pole of the second magnet, and an S pole of the first magnet corresponds to an S pole of the second magnet;
   wherein the first magnet comprises a bar magnet, a U-shaped magnet, or an electromagnet; and/or the second magnet comprises a bar magnet, a U-shaped magnet, or an electromagnet;
   wherein the control circuit is connected to opposite ends of the second magnet; and
   wherein the control circuit is a series circuit and further comprises: a power supply, a switch, a resistor, and a sliding rheostat, which are connected in series in the control circuit.

6. The display device according to claim 5, wherein:
   a spring is disposed between the second support plate and the third support.

7. The display device according to claim 5, further comprising a control system and an angle sensor, wherein the control system is configured to control on and off of the control circuit, and the angle sensor is configured to obtain an angle between the first support and the second support.

8. The display device according to claim 5, wherein:
the control system comprises a processor and a database, and the database is configured to store the angle obtained by the angle sensor;
when the angle is greater than 0°, the processor outputs an instruction to turn on the switch, the control system controls the control circuit to turn on the switch and move the sliding rheostat, and the second magnet starts to work; and
when the angle is 180°, the sliding rheostat has a maximum resistance value.

9. The display device according to claim 5, wherein:
the display panel has a bending portion corresponding to the third support.

* * * * *